(12) United States Patent
Nabe et al.

(10) Patent No.: US 7,440,385 B2
(45) Date of Patent: Oct. 21, 2008

(54) OPTICAL PICKUP DEVICE

(75) Inventors: Mitsuhiro Nabe, Ota (JP); Kenichi Takeuchi, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 573 days.

(21) Appl. No.: 11/110,386

(22) Filed: Apr. 20, 2005

(65) Prior Publication Data
US 2005/0237905 A1  Oct. 27, 2005

(30) Foreign Application Priority Data
Apr. 22, 2004 (JP) ............... 2004-126806
Dec. 20, 2004 (JP) ............... 2004-367433

(51) Int. Cl.
*G11B 7/00* (2006.01)
(52) U.S. Cl. .................................. 369/120
(58) Field of Classification Search ............ None
See application file for complete search history.

(56) References Cited

U.S. PATENT DOCUMENTS 5,247,386 A * 9/1993 Saito ..................... 359/216
6,664,998 B1 * 12/2003 Kyoya et al. ............. 347/241
7,209,412 B2 * 4/2007 Nagata et al. ............ 369/44.14
2002/0172145 A1 * 11/2002 Fujita et al. .............. 369/300

FOREIGN PATENT DOCUMENTS

| JP | 2001351262 | 12/2001 |
| JP | 2002251776 | 9/2002 |
| JP | 2002352445 | 12/2002 |
| JP | 2003-263751 | 9/2003 |

OTHER PUBLICATIONS

Machine translation of Matsui, JP 2003-263751, published Sep. 19, 2003.*
State Intellectual Property Office of P.R. China, "Notification of First Office Action," (Jun. 9, 2006).

* cited by examiner

*Primary Examiner*—Joseph Feild
*Assistant Examiner*—Peter Vincent Agustin
(74) *Attorney, Agent, or Firm*—Pillsbury Winthrop Shaw Pittman LLP (57) ABSTRACT

An optical pickup device comprises a photodetector for receiving laser light reflected from a disc and a housing in which the photodetector is housed, and the photodetector is directly attached to the housing. Through the use of the optical pickup device, occurrence of positional deviation of the photodetector can be suppressed, even under greatly changing temperatures.

8 Claims, 7 Drawing Sheets

OPTICAL PICKUP DEVICE

The entire disclosure of Japanese Patent Applications No. 2004-367433 and No. 2004-126806 including their specifications, claims, drawings, and abstracts are incorporated herein by reference.

BACKGROUND OF THE INVENTION

1. Field of the Invention

The present invention relates to an optical pickup device in which a photodetector does not deviate from its proper position, even when undergoing a significant change in temperature.

2. Description of the Related Art

Figure 6:
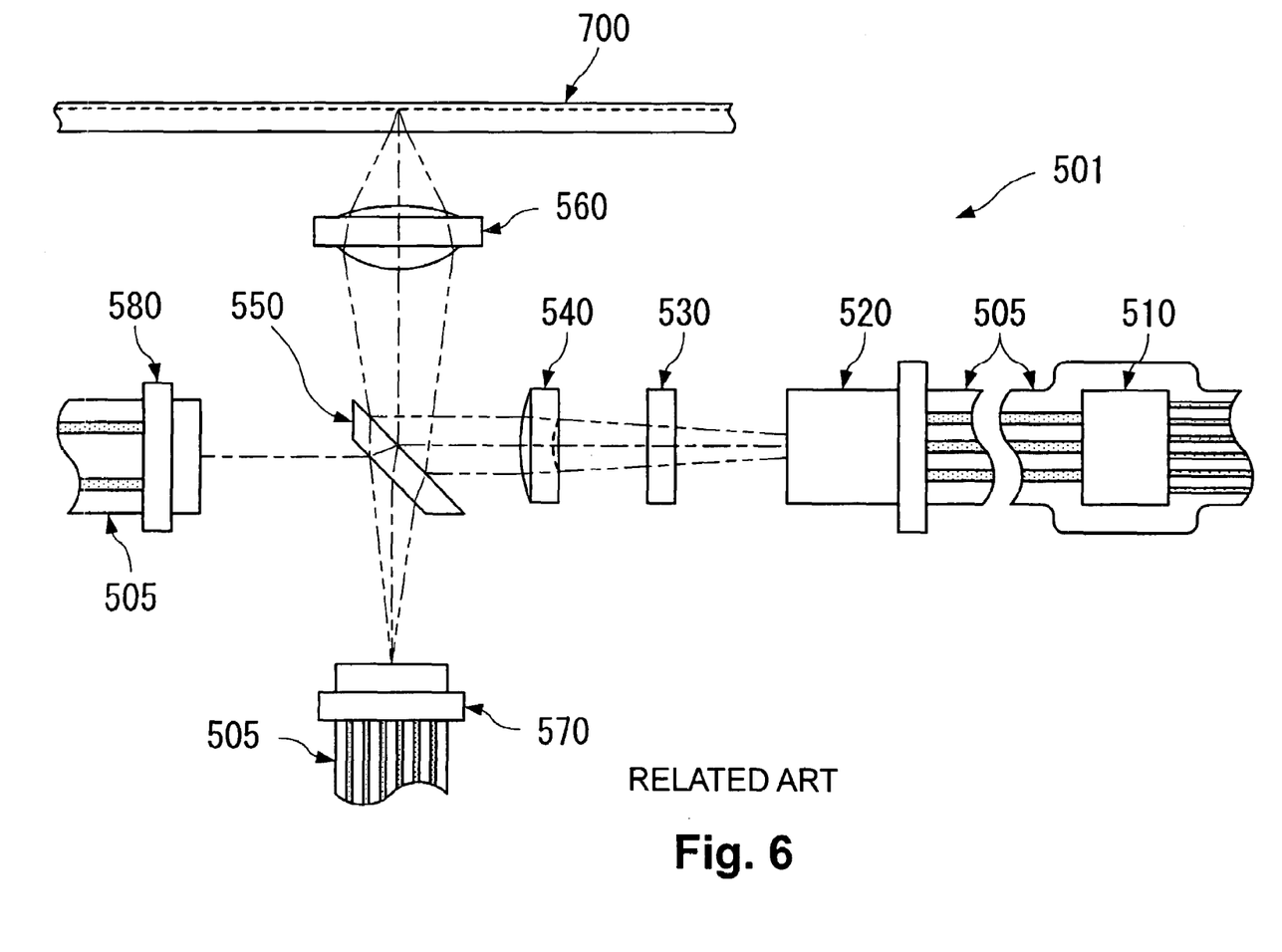
FIG. 6 is an explanatory drawing showing an example of a related art optical pickup device.
Figure 7:
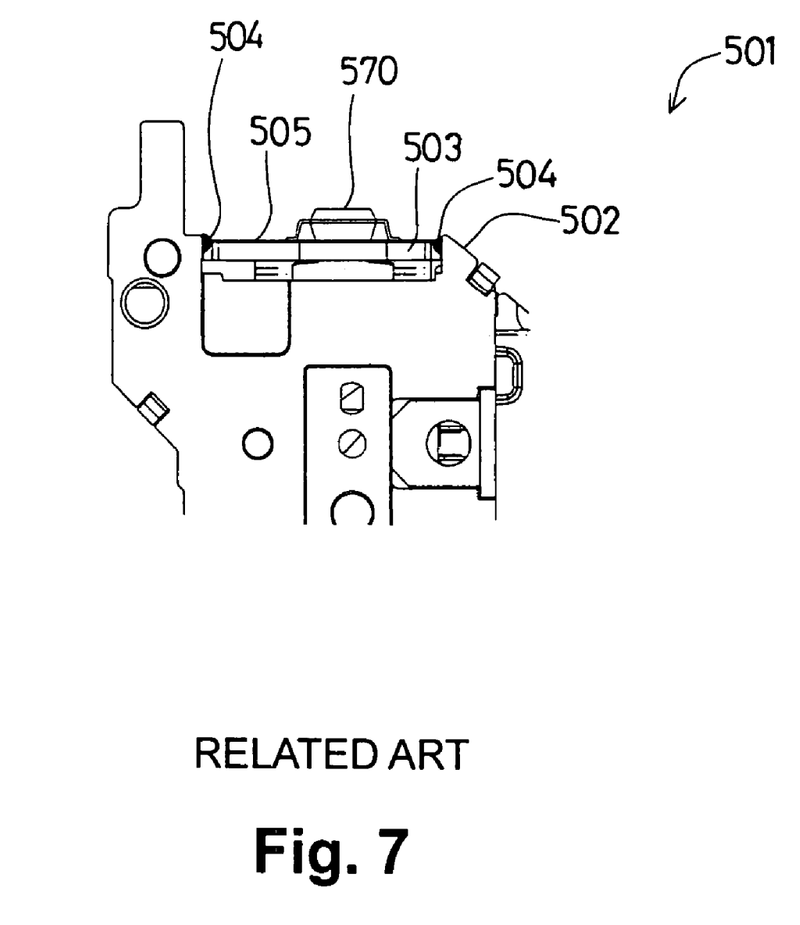
FIG. 7 is an enlarged view showing the main section of a related art optical pickup device.

FIG. 6 is an explanatory diagram showing an example of an optical pickup device, with FIG. 7 being an enlarged view showing the main section of the optical pickup device.

A current is fed from an LDD (laser diode driver) 510 (shown in FIG. 6) to an LD (laser diode) 520, to thereby cause the LD 520 to output laser light. Here, the LD is an example component for emitting laser light and is also referred to as a light emitting element. The LDD 510 is a laser driving circuit which activates and causes the LD 520 to emit laser light. A current fed from the laser diode driver (LDD) 510 to the laser diode (LD) 520 causes the laser diode (LD) 520 to emit laser light, and, by means of the laser light, data recording onto a disc 700 or reading of data recorded on the disc 700 is performed.

The laser light output from the LD 520 is irradiated via a diffraction grating 530, an intermediate lens 540, a half mirror 550, and an object lens 560 onto the disc 700. A portion of the laser light reflected from the disc 700 is applied to a PDIC (photo diode IC) 570. The PDIC 570 transforms incident light into an electrical signal to activate a servo mechanism (not illustrated) for a lens holder (not illustrated) in an optical pickup device 501. The PDIC, which detects incident light, is also referred to as a photodetector. A servo denotes a mechanism to automatically correct and control a state of a control target based on a result of detecting the state of the control target and comparing the measured state with a predetermined reference value.

Further, a portion of the laser light output from the LD 520 enters into a FMD (front monitor diode) 580, for monitoring the laser light emitted from the laser diode to provide feedback for controlling the laser diode.

The LDD 510, the LD 520, the diffraction grating 530, the intermediate lens 540, the half mirror 550, the object lens 560, the PDIC 570, and the FMD 580 are installed in a housing 502 shown in FIG. 7. The LDD 510, the LD 520, the PDIC 570, and the FMD 580 shown in FIG. 6 are electrically and physically connected to an FPC (flexible printed circuit) 505. In the FPC 505, a plurality of circuit conductors are printed on an insulation sheet; a metal foil, such as copper foil, for example, is disposed on the insulation sheet; and a protective layer is provided on the sheet. The optical pickup device 501 comprises the above-described various components. Although the optical pickup device 501 includes components other than those illustrated in the drawing, the additional components are not depicted in FIG. 6 in order to simplify the diagram.

The optical pickup device 501 is used to read or record data, such as information, on a medium. As such a medium, there has been provided a wide variety of optical discs including a read-only optical disc, such as a CD-ROM, DVD-ROM, or the like, a write-once optical disc, such as a CD-R, DVD±R, or the like, and an writable/erasable or rewritable optical disc, such as a CD-RW, a DVD±RW, a DVD-RAM, or the like.

CD is an abbreviation for "compact disc", and DVD is an abbreviation for "digital versatile disc" or "digital video disc". Further, ROM in "CD-ROM" and "DVD-ROM" is an abbreviation for "read only memory", and a CD-ROM and a DVD-ROM are read only discs. In addition, R in "CD-R" and "DVD±R" stands for "Recordable", and a CD-R and a DVD±R are writable. RW in "CD-RW" and "DVD±RW" stands for "Re-Writable", and a CD-RW and a DVD±RW are rewritable. Further, DVD-RAM which is an abbreviation for "digital versatile disc random access memory" is readable, writable, and erasable.

The optical pickup device 501 is defined as a unit used for reading data recorded on the above-described various optical discs and recording data on one or more of the various writable or rewritable optical discs.

When the current passes through the LDD 510 causing the LD 520 to emit laser light, heat is generated in the LD 520. Because the wavelength of laser oscillation in the LD 520 is dependent on the temperature upon emission of the laser light from the LD 520, significant variations in the temperature of the LD 520 result in variations in the wavelength of the laser light emitted from the LD 520. Further, because the LDD 510 also generates heat when the laser light is emitted from the LD 520 by the passage of a current fed from the LDD 510 to the LD 520, both the LDD 510 and the LD 520 are regarded as major heat sources in the optical pickup device 501.

As shown in FIG. 7, the PDIC 570 mounted on a FPC 505 is electrically connected to the FPC 505 by means of soldering. The FPC 505 is attached to an aluminum plate 503 which is bonded to a housing 502 using an adhesive 504. In FIG. 7, the solid black regions represent the adhesive 504. In this manner, the PDIC 570 is mounted, via the FPC 505 and the aluminum plate 503, to the housing 505.

In addition to the above-described technology, a method of securely fixing an optical pickup to a plate equipped with an electronic component is disclosed in which the plate equipped with an electronic component such as a photodiode is properly positioned even under adverse conditions of temperature changes, vibrations, or the like, while still reducing manufacturing costs.

However, there has been a concern regarding the optical pickup device 501 shown in FIG. 7 that if the temperature of the optical pickup device 501 greatly changes, installation position of the PDIC 570 will be shifted relative to the housing 502.

As described above, the PDIC 570 is placed on the housing 502 via the FPC 505 and the aluminum plate 503 and attached to the housing 502 by means of the adhesive 504 applied to a junction between the housing 502 and the aluminum plate 503 having the PDIC 570 and the FPC 505. Because, with such a configuration, any increase in temperature of the optical pickup device 501 causes all components, such as, for example, the housing 502, the aluminum plate 503, the adhesive 504, the FPC 505, and the PDIC 570, to expand and the solder connecting the FPC 505 and the PDIC 570 or the like to soften, positional deviations in each component are possible, and common.

Although the amount of positional deviation for each of the components is generally considered trivial, any positional error in the mounting of the PDIC 570 (photodetector) relative to the housing 502 will be increased when the amount of positional deviation for each of the component is accumulated. The increased mounting error of the PDIC 570 (photodetector) relative to the housing 502 leads to a change in focus of light incident upon the PDIC 570 (photo detector shown in FIG. 6). Because such a change develops a greater likelihood of unstable operation of the servo mechanism in the optical pickup device 501, there has been concern that precise operation of the servo mechanism cannot be assured.

SUMMARY OF THE INVENTION

The present invention provides an optical pickup device comprising a photodetector which receives laser light reflected from a disc and a housing in which the photodetector is installed, and in which the photodetector is directly attached to the housing.

BRIEF DESCRIPTION OF THE DRAWINGS

A preferred embodiment of the present invention will be described in detail based on the following figures, wherein.

DESCRIPTION OF THE PREFERRED EMBODIMENT

Referring now to the drawings, an optical pickup device according to an embodiment of the present invention will be described below.

Figure 1:
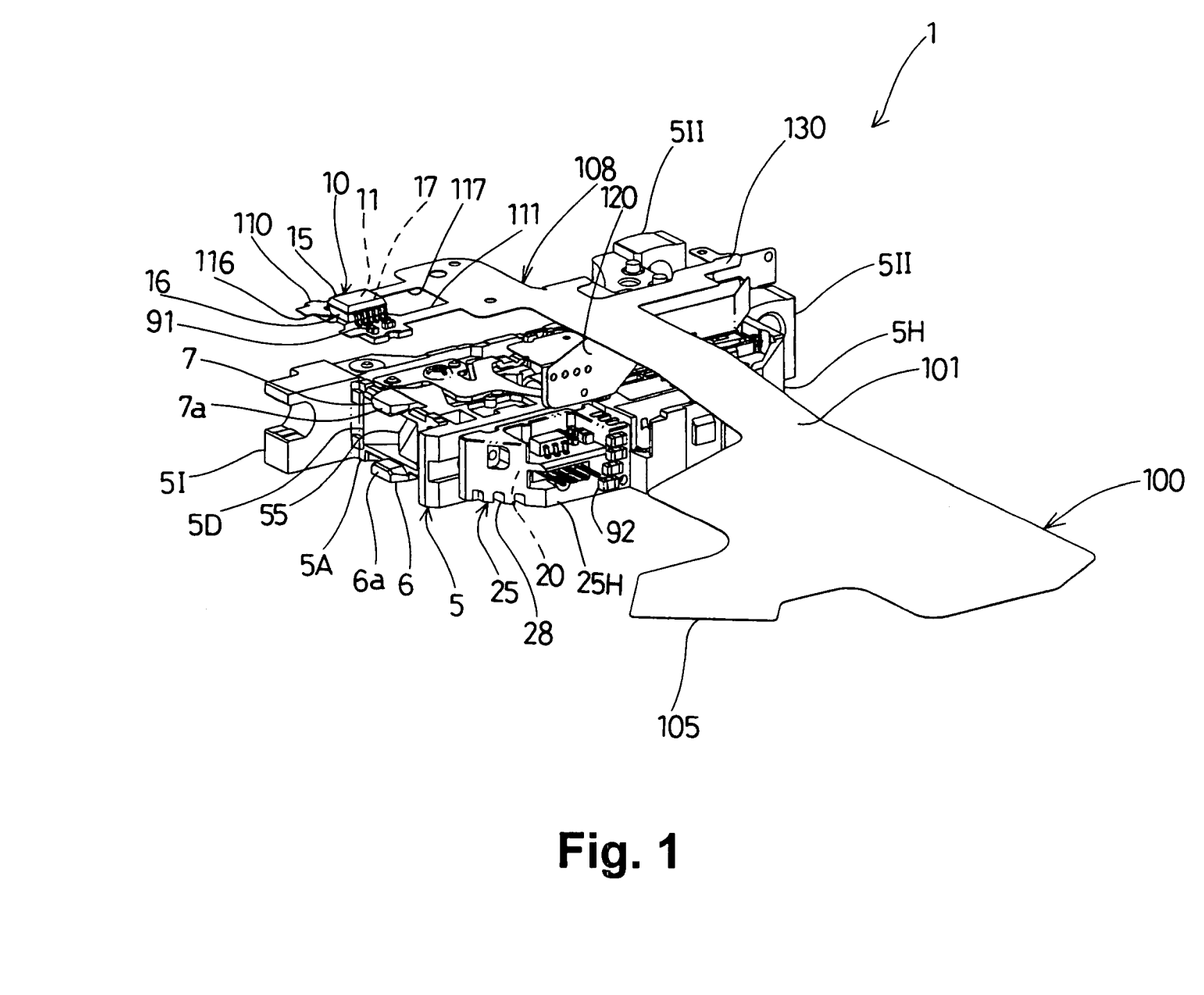
FIG. 1 is an exploded perspective view showing an optical pickup device according to an embodiment of this invention.
Figure 2:
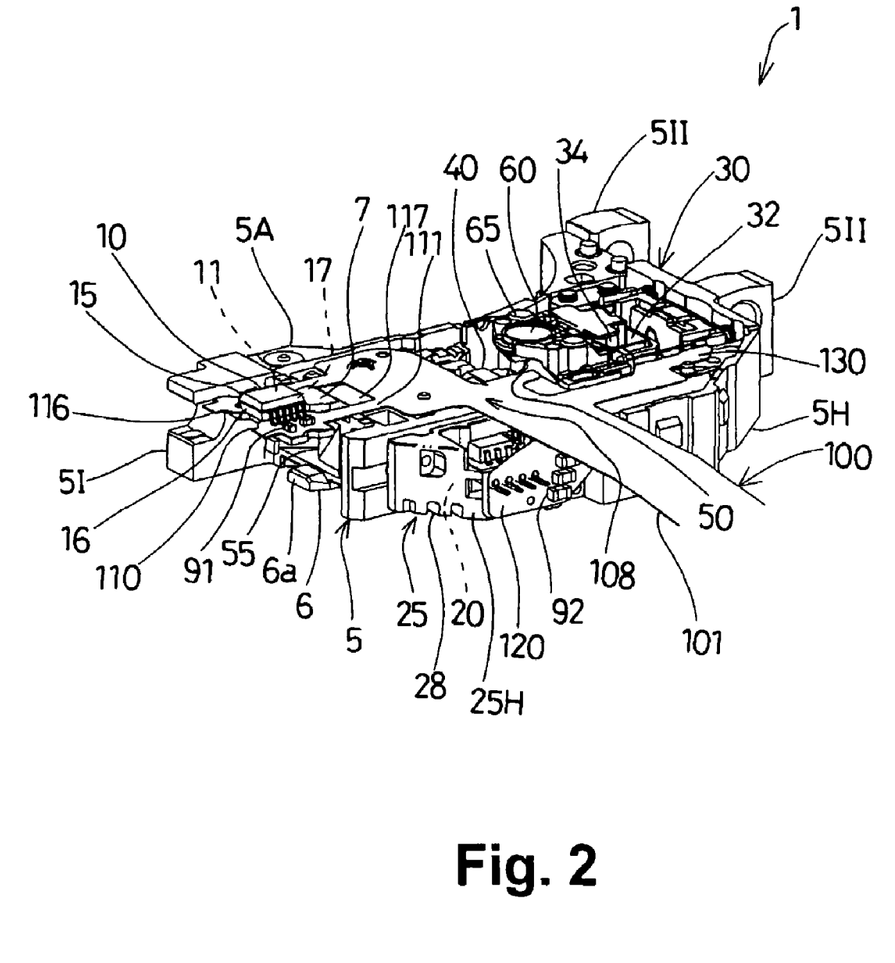
FIG. 2 is a perspective view showing an example process of assembling an optical pickup device as shown in FIG. 1.
Figure 3:
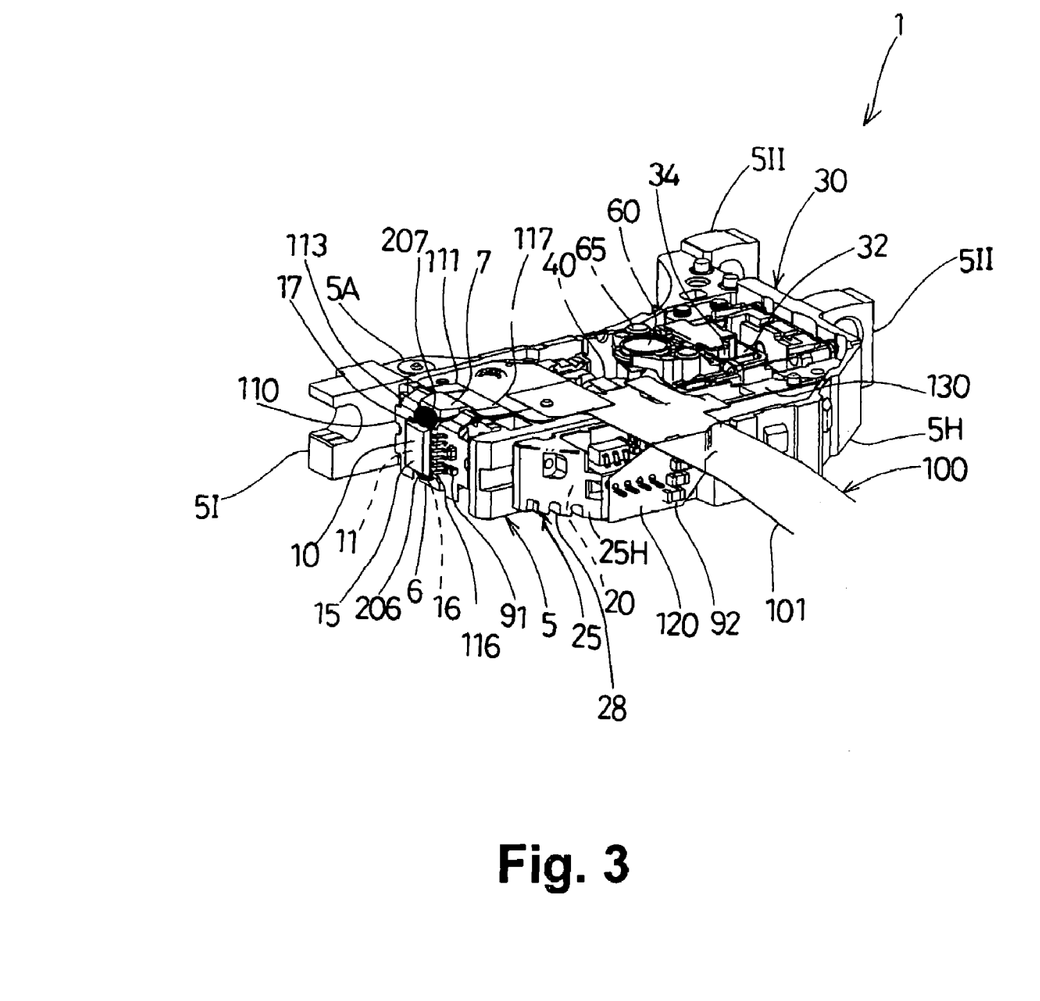
FIG. 3 is a perspective view showing a process of assembling an optical pickup device using an adhesive.
Figure 4:
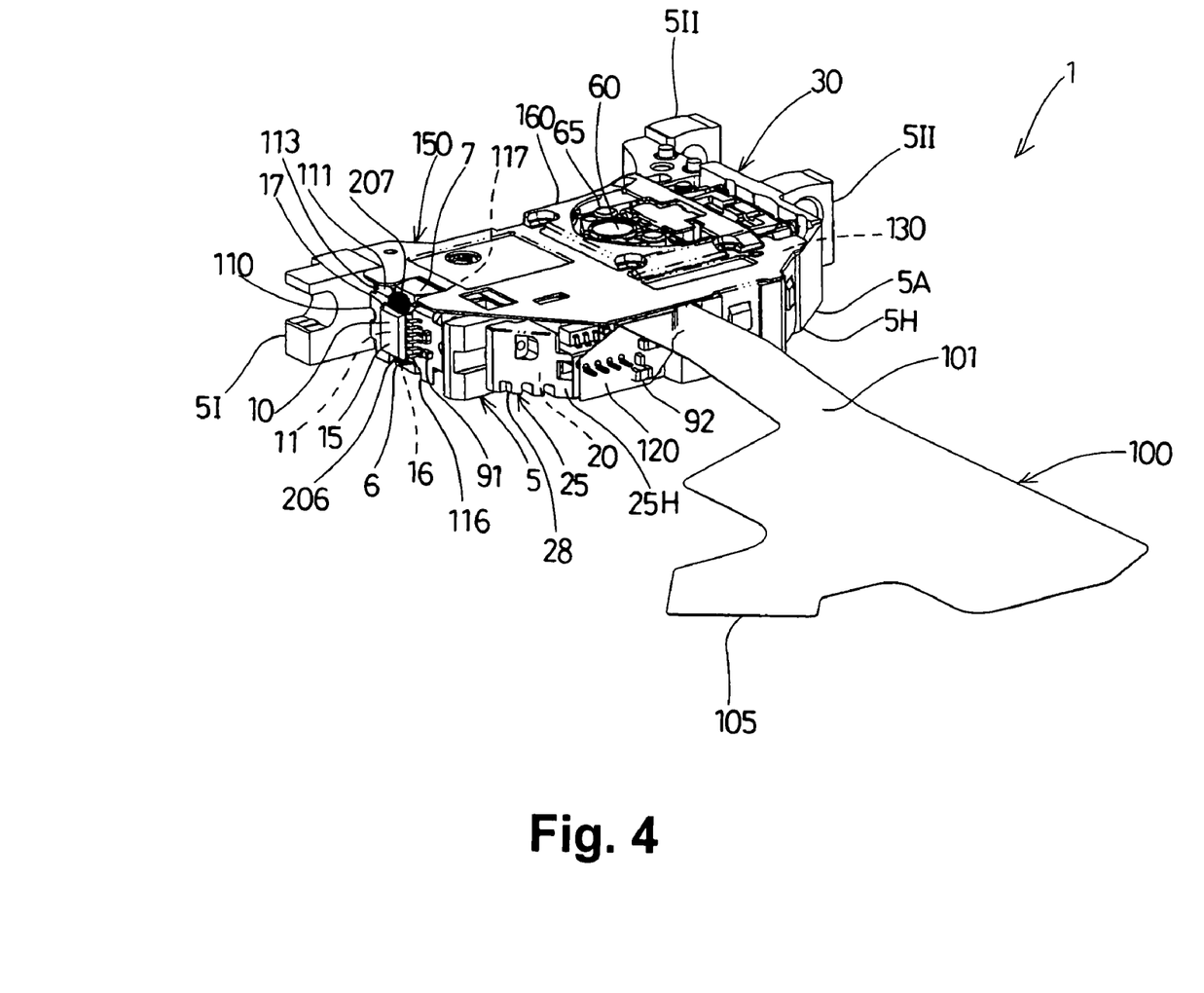
FIG. 4 is a perspective view showing an assembled optical pickup device.
Figure 5:
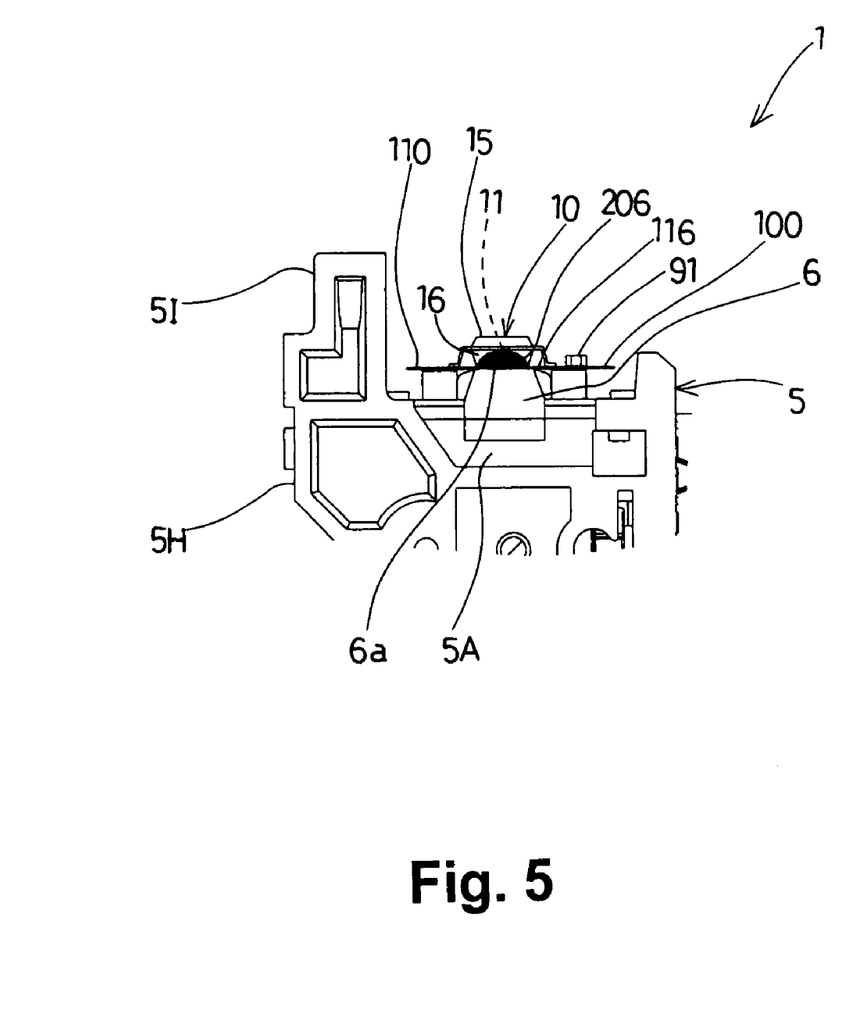
FIG. 5 is an enlarged view showing the main components of an optical pickup device.

FIG. 1 is an exploded perspective view showing an optical pickup device according to the embodiment of the present invention. FIG. 2 is a perspective view showing a process of assembling the optical pickup device. FIG. 3 is a perspective view showing a process of assembling the optical pickup device through using an adhesive. FIG. 4 is a perspective view showing an assembled optical pickup device. FIG. 5 is an enlarged view showing the principle components of an optical pickup device.

FIGS. 1 to 4 show a perspective view of the optical pickup device viewed from an upper side, and FIG. 5 is an enlarged view of the optical pickup device viewed from a lower side. It should be noted that, in this specification, the "upper side" and the "lower side" are defined for convenience to explain an optical pickup device.

An optical disc apparatus (not illustrated) comprising an optical pickup device (OPU) is used to read data such as information recorded on an optical disc and to record data on an optical disc. An optical disc may be, for example, a read-only optical disc, such as a CD-ROM, a DVD-ROM, or the like, a write-once optical disc, such as a CD-R, a DVD-R, a DVD+R, or the like, and an writable/erasable or rewritable optical disc, such as a CD-RW, a DVD-RW, a DVD+RW, a DVD-RAM, a HD DVD, a Blue-ray disc, or the like.

An HD DVD (High Definition DVD) disc is a disc having a storage capacity greater than that of conventional DVD discs but compatible with conventional DVD discs. Red laser light is conventionally used for CDs and DVDs, whereas blue-violet laser light is used when data recorded on an HD DVD optical disc of is read. It should be noted that the term "Blue-ray" denotes blue-violet laser light which is employed in place of the red laser light having been used for reading/writing a signal from/on conventional CDs and DVDs because high-density recording can be achieved by the blue-violet laser light.

By feeding a current from a laser driver (not illustrated) to a laser diode 20 (shown in FIGS. 1 to 4), laser light is output from the laser diode 20. The laser driver is a laser driving circuit for activating and causing the laser diode 20 to emit laser light.

To replay a CD, laser light with a wavelength of approximately 770 to 805 nm is output from the laser diode 20, while laser light with a wavelength of approximately 630 to 670 nm is output from the laser diode 20 to replay a DVD. As such, the laser diode (LD) 20 may be a two-wavelength laser diode 20 capable of emitting laser light having different wavelengths. By employing the two-wavelength laser diode 20 as the LD 20, for example, a component count of an LD is reduced, thereby enabling size and weight reduction in an optical pickup device 1.

The two-wavelength LD 20 is housed in a metallic laser holder 25 having good heat dissipation characteristics. In view of the LD 20 housed in the laser holder 25, the laser holder 25 is also referred to as a LD holder 25.

The LD holder 25 is composed of an alloy including zinc which is highly resistant to corrosion yet lower in cost. Zinc and aluminum are nonferrous metals having good anticorrosion characteristics and having a lower specific gravity than ferrous metals. When the LD holder is made of the nonferrous metal, such as zinc, aluminum, or the like, or an alloy including zinc or aluminum, the LD holder is resistant to rusting, which is preferable in terms of maintaining preferable heat dissipation characteristics.

Further, a body 25H of the LD holder 25 is equipped with a plurality of thin radiator fins 28 to dissipate heat of the LD holder 25. The provision of the radiator fins 28 on the body 25H of the LD holder 25 helps protect the LD holder 25 from overheating due to the heat emitted from the LD 20, which in turn prevents a significant change in wavelength of laser light emitted from the LD 20 housed in the LD holder 25. The radiator fins 28 may preferably be engraved or carved into the body 25H of the LD holder 25 instead of being protruded from the holder body 25H.

Further, by employing the LD holder 25 having good heat dissipation characteristics, build up of heat in the optical pickup device 1 can be prevented, thereby preventing the optical pickup device 1 from becoming abnormally hot. Accordingly, the possibility that the optical pickup device 1 is heated to a high temperature and used under extreme conditions of severe temperature changes can be prevented.

By means of laser light emitted from the LD 20 when a current is fed from the laser driver to the LD 20, data is recorded on an optical disc, or data recorded on an optical disc is read.

The laser light output from the LD 20 is applied, via a diffraction grating (not illustrated), a prism (not illustrated), an intermediate lens 40 (shown in FIG. 2), a reflect mirror 50 (shown in FIG. 2), and an object lens 60 (shown in FIGS. 2-4), on the optical disc (not illustrated).

The diffraction grating works to split the laser light emitted from the LD 20 into three beams comprising one main beam and two sub-beams through the use of diffraction of light. The prism plays a role in preventing the occurrence of astigmatism upon transmission of laser light for DVD. In addition, the intermediate lens 40 works for gathering laser light, and the reflect mirror (RM) 50 mainly reflects laser light and partially passes the laser light. In place of the reflect mirror 50, a half mirror may, for example, be provided. The object lens (OBL) 60 focuses the laser light output from the LD 20 on an optical disc such as a CD or a DVD. Here, an object lens 60 made of a synthetic resin (shown in FIGS. 2 to 4) is housed in a lens holder 65 made of a synthetic resin.

A portion of the laser light reflected from the optical disc passes through a half mirror 55 (shown in FIGS. 1 and 2) attached to an inner surface of a housing body 5H, then passes through a roughly rectangular opening 5D (shown in FIG. 1) provided at a location ahead of the half mirror 55, and then strikes a photodetector 10 (shown in FIGS. 3 to 5) mounted on an outer surface of the housing body 5H. The photodetector 10 is located along a virtually extended optical axis of the portion of the laser light reflected from the optical disc. Upon receipt of the laser light, the photodetector 10 transforms a signal of the laser light into an electrical signal for causing the servo mechanism in an actuator 30 (shown in FIGS. 2 to 4) to move the lens holder 65 retaining the OBL 60 to an appropriate position.

The photodetector 10 (Shown in FIGS. 1 to 5) comprises a photo receiver 11 on which the laser light is irradiated and a almost transparent protective member 15 formed in the shape of a roughly rectangular box for protecting the photo receiver 11 against external environment. A surface opposite to one side surface (a first side surface) 16 of the protective member 15 in the shape of the roughly rectangular box is defined as the other side surface (second side surface) 17 of the protective member 15 (shown in FIGS. 1 to 4). The half mirror (HM) 55 (shown in FIGS. 1 and 2) allows a portion of the laser light to pass while reflecting another portion.

An actuator denotes a unit which moves and adjusts an object. An actuator 30 (shown in FIGS. 2 and 3) comprises a roughly rectangular cylinder coil 32 which is wound around the inner surface of the lens holder 65 and a magnet 34 located near the roughly rectangular cylinder coil 32. In addition, the actuator 30 holds the lens holder 65 having a coil 32 through which a current flows. The actuator 30 performs focus adjustment and tracking control of the lens holder 65 retaining the OBL 60.

Further, a front monitor diode (not illustrated) which monitors the laser light output from the LD 20 to provide feedback for controlling the LD 20, for example, may be installed in the optical pickup device 1 shown in FIGS. 1 to 4.

The LDD, the LD 20, the actuator 30, the PDIC 10, and capacitors 91 and 92 are connected in an electrically communicable manner to a flexible substrate 100, and various electrical/electronic components including the PDIC 10, the LD 20, and the capacitors 91 and 92 are mounted on the flexible substrate 100 (shown in FIGS. 2 to 4).

As shown in FIG. 1, the flexible substrate 100 comprises at least a main circuit portion 101 constituting a main body of the flexible substrate 100, sub-circuit portions 110, 120, and 130 branched off from the main circuit portion 101. The flexible substrate 100 is a highly flexible thin-walled circuit board.

More specifically, the flexible substrate 100 comprises the main circuit portion 101, a connector portion 105, a first sub-circuit portion 110, a coupling portion 111, a second sub-circuit portion 120, and a third sub-circuit portion 130. The main circuit portion 101 constitutes a main body of the flexible substrate 100, and the connector portion 105 is provided to the main circuit portion 101 and connected to a counter circuit board (not illustrated). The first sub-circuit portion 110 is extended from the main circuit portion 101 and connected to the PDIC 10 in an electrically communicable manner. The coupling portion 111 joins the main circuit portion 101 and the first sub-circuit portion 110. The second sub-circuit portion 120 extending from the main circuit portion 101 is connected to the two-wavelength LD 20 in an electrically communicable manner. The third circuit portion 130 extending from the main circuit portion 101 is connected, in an electrically communicable manner, to the actuator 30 for actuating the lens holder 65.

The flexible substrate 100 may be an FPC (flexible printed circuit) configured by printing a plurality of circuit conductors (not illustrated) on an insulation sheet; disposing a metal foil, such as, for example, copper foil on the insulation sheet; and providing a protective layer over the insulation sheet. In FIGS. 1 to 4, the FPC 100 is schematically illustrated for simplification, and therefore the circuit conductors are omitted from the drawing of the FPC 100.

Because various electrical/electronic components, such as the PDIC 10, are connected to the flexible substrate 100 in an electrically communicable manner by means of soldering, a base of the FPC 100 is composed of a heat-resistant synthetic polymer, such as a polyimide resin which is highly resistant to heat. "Polyimide" is abbreviated as "PI". As the FPC in which the base is formed using a polyimide resin, for example, Nitto Flex® manufactured by Nitto Denko Corporation, KAPTON® manufactured by DuPont-Toray Co., Ltd, or the like may be employed.

For Nitto Flex® of Nitto Denko Corporation, for example, High Density and Precision Flexible Printed Circuit (Double sided type), High Density and Precision Flexible Printed Circuit, Micro Access Flexible Printed Circuit, High Insulating Resistance Reliability Flexible Printed Circuit, High Heat Resistant Flexible Printed Circuit, High Flex Fatigue Life Flexible Printed Circuit, and others are commercially available. On the other hand, for KAPTON® of DuPont-Toray Co., Ltd., for example, KAPTON® Type H, KAPTON® Type V, KAPTON® Type Super V, KAPTON® Type EN, KAPTON® Type KJ, etc. are commercially available. KAPTON® manufactured by DuPont-Toray Co., Ltd. can be used at a wide range of temperatures from a cryogenic temperature of $-269°$ C. to a high temperature of about $+400°$ C.

Environmentally friendly solder which contains no lead, i.e. so-called lead-free solder, is used as a soldering material. Use of lead-free solder as a soldering material is preferable in terms of preventing harmful environmental effects lead entering the environment when the optical pickup device 1 or the flexible substrate 100 installed in the optical pickup device 1, for example, is discarded. Lead-free solders include, for example, ECO SOLDER M30 manufactured by Senju Metal Industry Co., Ltd., and lead-free solders of a reflow type include, for example, ECO SOLDER L21 of Senju Metal Industry Co., Ltd. A conventional solder material may be employed instead of the above-described lead-free solder. Conventional soldering materials include, for example, Sparkle Paste OZ series of Senju Metal Industry Co., Ltd.

A soldering method may be employed in which a soldering process of treating an object to be soldered is completed by applying a reflow solder material in the form of a paste to, for example, a principle part of the object to be soldered; placing the object to be soldered in a reflow solder vessel; melting the reflow solder material at temperatures of, for example, approximately 240 to $250°$ C.; and then gradually cooling the object. Because the FPC 100 is formed with the base made of polyimide resistant to the temperatures of about 240 to $250°$ C. under which the soldering process is performed, deformation of the FPC 100 due to, for example, heat can be prevented from occurring.

As polyimide, a heat-resistant polyimide which does not generate problems related to thermal distortion or the like when exposed to heat at the temperatures of, for example 240 to 250° C. is used. A material only resistant to heat at temperatures of up to 250° C. is not capable of resisting the heat applied in the soldering process. Materials resistant to heat at temperatures of about 400° C. or higher are expensive, and are therefore not suited to commercial mass production applications. A heat-resistant polyimide in which problems such as thermal distortion are not generated even when the polyimide is exposed to heat at a temperature of about 300° C. is sufficiently capable of surviving the soldering process.

The LD holder 25 in which the LD 20 is housed, the diffraction grating, the prism, the intermediate lens 40, the RM 50, the HM 55, the PDIC 10, and the FPC 100 are installed within a housing 5. In addition, the housing 5 further includes the actuator 30 for moving the object lens 60 to an appropriate position. The optical pickup device 1 is formed as a unit consisting of the above-described various components.

The housing 5 (shown in FIGS. 2 and 3) has a housing body 5H in which the diffraction grating, the prism, the intermediate lens 40, the RM 50, the HM 55 (shown in FIGS. 1 and 2), the lens holder 65 including the OBL 60 (shown in FIGS. 2 and 3), constituents of the actuator 30, and other components are housed.

In addition to the housing body 5H, the housing 5 further comprises fixing members 6 and 7, a first guide 5I, and two second guides 5II. In the housing body 5H, various components are installed. The fixing members 6 and 7 protruding from the housing body 5H is bonded to the PDIC 10. The first guide 5I protruding from the housing body 5H aligns to a first guide axis (not illustrated), and the second guides 5II, 5II protruding from the housing body 5H toward a direction opposite to the first guide 5I aligns to a second guide axis (not illustrated).

The first guide 5I, the second guides 5II, and the fixing members 6 and 7 are integrally formed with the housing body 5H by injection molding and therefore made of the same material as that of the housing body 5H. These components are formed in one piece by injection molding.

As described above, the housing 5 in which a synthetic polymer such as a synthetic resin is used as a base is formed through injection molding. The formation of the housing 5 using injection molding facilitates efficient mass production of the housing 5, even when the housing 5 has a complicated shape as shown in FIGS. 1 to 5. Further, by forming the housing 5 using the synthesis polymer such as a synthesis resin, the weight of the housing 5 is reduced to an extent greater than possible with a metallic housing. Accordingly, weight reduction of the optical pickup device 1 can be achieved, which in turn enables weight reduction of an optical disc apparatus (not illustrated) including the optical pickup device 1 embedded therein.

It is also preferable to form the housing 5 using, for example, nonferrous metals, such as zinc, aluminum or the like, or an alloy containing zinc or aluminum instead of the synthesis polymer, such as a synthesis resin, depending on design specifications of the optical pickup device. The zinc and the aluminum are nonferrous metals highly resistant to corrosion and of lower specific gravity than that of iron.

As shown in FIGS. 1 to 5, the optical pickup device 1 comprises at least the PDIC 10 which receives the laser light reflected from the optical disc, such as a CD or a DVD, and the housing 5 to which the PDIC 10 is attached. In FIGS. 3 to 5, the PDIC 10 is directly attached to the housing 5. More specifically, it is preferable that the PDIC 10 be directly bonded to the housing 5.

As long as the PDIC 10 is directly attached to the housing 5, it is possible to install the PDIC 10 in the housing 5 with a high degree of precision. In particular, direct bonding between the PDIC 10 and the housing 5 brings about an effect that the placement of the PDIC 10 in the housing 5 is precisely determined.

It is quite conceivable that the optical pickup device 1 will be used at temperatures ranging, for example, from approximately 0° C. to approximately 70° C. However, even though the optical pickup device 1 is used under such conditions that the temperature significantly changes, positional error of the position of the mounting of the PDIC 10 relative to the housing 5 can be suppressed as long as the PDIC 10 is directly attached to the housing 5. In addition, by direct bonding between the PDIC 10 and the housing 5, an accumulated positional error of placement of the PDIC 10 relative to the housing 5 is also minimized.

Through minimization of the errors, such as error in positioning of the mounting of the PDIC and the accumulated positional error of the PDIC 10 relative to the housing 5, any increase in the positional deviation of the PDIC 10 is prevented. As a result, the servo mechanism constituting the actuator 30 in the optical pickup device 1 can operate in a stable manner without causing a significant change in focus of light incident on the PDIC 10. In other words, because the PDIC 10 is directly bonded and directly attached to the housing 5, capabilities of accurate servo mechanism can be delivered in the optical pickup device 1.

The PDIC 10 comprises the photo receiver 11 to which the laser light is applied and the protective member 15 which protects the photo receiver 11 from external environment and to which adhesives 206 and 207 are applied. The protective member 15 is formed using an almost transparent synthetic resin material in the shape of a roughly rectangular box.

The protective member 15 constituting the PDIC 10 has a pair of side surfaces 16 and 17 (shown in FIGS. 1 and 2) to which the adhesives 206 and 207 (shown in FIGS. 3 and 4) are applied. A pair of fixing members 6, 7 (shown in FIG. 1) to which the adhesives 206 and 207 (shown in FIGS. 3 and 4) are also applied are formed protruding from the housing 5 in accordance with the pair of side surfaces 16, 17 of the protective member 15 in the shape of a roughly rectangular box. In FIGS. 3 to 5, the adhesives 206 and 207 are shown as solid areas for convenience of illustration.

The adhesive 206 to fix the PDIC 10 (shown in FIGS. 3 to 5) on the housing 5 is applied to an area between one side surface (the first side surface) 16 (shown in FIGS. 1 and 5) of the protective member 15 constituting the PDIC 10 (shown in FIG. 1) and one fixing member (the first fixing member) 6 (shown in FIGS. 1 and 5) protruding from the housing 5 (shown in FIG. 1). Similarly, the adhesive 207 to fix the PDIC 10 (shown in FIGS. 3 and 4) on the housing 5 is applied to an area between the other side surface (the second side surface) 17 of the protective member 15 constituting the PDIC 10 (shown in FIGS. 1 to 4) and the other fixing member (the second fixing member) 7 protruding from the housing 5 (shown in FIG. 1). In this manner, the PDIC 10 is directly bonded to the housing 5.

In this configuration, the PDIC 10 is attached to the housing 5 with a high degree of precision. By such application of the adhesive 206 applied to the area between the one side surface 16 of the protective member 15 constituting the PDIC 10 and the one fixing member 6 provided to the housing 5 and of the adhesive 207 deposited on the area between the other side surface 17 of the protective member 15 constituting the PDIC 10 and the other fixing member 7 provided to the housing 5, the PDIC 10 is precisely mounted on the housing 5 after hardening of the adhesives 206 and 207 applied at two locations.

In this manner, the optical pickup device 1 in which the PDIC 10 is mounted on the housing 5 with a high degree of precision can be provided to a manufacturer, such as a factory for assembling optical disc apparatus. Also in a factory for assembling the optical disc apparatus 1 or the like, it is possible to precisely mount the PDIC 10 on the housing 5.

On the other hand, it is preferred that the photo receiver 11 to which the laser light is applied be comprised as a component of a photodetector 10 also comprising the protective member 15 which protects the photo receiver 11 and to which the adhesives 206 and 207 are applied. Further, the fixing members 6 and 7 to which the adhesives 206 and 207 are applied corresponding to the protective member 15 are provided to the housing 5. In addition, the photodetector 10 is preferably bonded directly to the housing 5 by applying, to the protective member 15 and the fixing members 6 and 7, the adhesives 206 and 207 to fix the photodetector 10 to the housing 5.

With the above-described structure, the photodetector 10 can easily be bonded to the housing 5. More specifically, by applying the adhesives 206 and 207 to both the protective member 15 constituting the photodetector 10 and protrusions 6 and 7 extending from a peripheral wall 5A of the housing 5 toward the outside of the housing 5, the photodetector 10 can be mounted on the housing 5 easily. In this manner, it becomes possible to provide an optical pickup device 1 configured such that the photodetector 10 is easily mounted on the housing 5 with a high degree of precision.

More specifically, a pair of the side surfaces 16 and 17 of the PDIC 10 are aligned to a pair of the fixing members 6 and 7 provided to the housing 5, respectively, and the adhesives 206 and 207 are applied to two aligned points, and then the PDIC 10 is precisely fixed to the pair of the fixing members 6 and 7 protruding from the housing 5 when the adhesives 206 and 207 are cured. The adhesives 206 and 207 may be light-curing adhesives 206 and 207 which are hardened through application of light.

As shown in FIG. 1, the pair of the fixing members 6 and 7 provided to the housing 5 are formed to be a pair of flat-shaped bonding protrusions 6 and 7 extended almost in parallel with each other from the peripheral wall 5A of the housing 5 toward the outside of the housing 5. The adhesives 206 and 207 are applied to tip faces 6 and 7 of the bonding protrusions 6 and 7.

The provision of such a pair of the bonding protrusions 6 and 7 facilitates easy attachment of the PDIC 10 to the housing 5.

To join the protective member 15 constituting the PDIC 10 (shown in FIGS. 3 to 5) and one bonding protrusion (a first bonding protrusion) 6 extended toward the outside of the housing 5 through the adhesive 206, the adhesive 206 (shown in FIGS. 3 to 5) used to bond them is applied to an area between the one side surface 16 of the protective member 15 constituting the PDIC 10 and the tip face 6a (shown in FIG. 1) of the one bonding protrusion 6 extended toward the outside of the housing 5. More specifically, the adhesive 206 is applied primarily on the area between the one side surface (the first side surface) 16 of the protective member 15 constituting the PDIC 10 and the tip face 6a of the one bonding protrusion (the first bonding protrusion) 6 extended from the peripheral wall 5A of the housing body 5H constituting the housing 5 toward the outside of the housing 5.

On the other hand, to join the protective member 15 constituting the PDIC 10 (shown in FIGS. 3 and 4) and the other bonding protrusion (a second bonding protrusion) 7 extended toward the outside of the housing 5 through the adhesive 207, the adhesive 207 (shown in FIGS. 3 and 4) to bond them is applied to an area between the other side surface 17 of the protective member 15 constituting the PDIC 10 and the tip face 7a (shown in FIG. 1) of the other bonding protrusion 7 extended toward the outside of the housing 5. More specifically, the adhesive 207 is applied primarily on the area between the other side surface (the second side surface) 17 of the protective member 15 constituting the PDIC 10 and the tip face 7a of the other bonding protrusion (a second bonding protrusion) 7 extended from the peripheral wall 5A of the housing body 5H constituting the housing 5 toward the outside of the housing 5.

Through the hardening of the adhesives 206 and 207 on two locations, the PDIC 10 is mounted on the housing 5 easily and with a high degree of precision. Because operation of bonding the photodetector 10 to the housing 5 can easily be completed, the occurrence of faulty bonding due to difficulties in bonding operation is reduced accordingly. Such facilitated bonding operation allows accurate bonding of the side surfaces 16 and 17 of the protective member 15 constituting the photodetector 10 and the tip faces 6a and 7a of the fixing members 6 and 7 in the housing 5. It is therefore possible to provide the optical pickup device 1 in which the PDIC 10 is easily and precisely configured in the housing 5 to a manufacturer, such as an optical disc apparatus fabricator. Further, in a fabricator of the optical pickup device 1, the PDIC 10 can be mounted on the housing 5 with ease and with a high degree of precision in assembling operation of the optical pickup device 1.

As shown in FIG. 1, the pair of the bonding protrusions 6 and 7 are extended along the same direction as that of the first guide 5I extended from the housing body 5H. In other words, the pair of the bonding protrusions 6 and 7 are extended along a virtually extended optical axis of a portion of the laser light reflected from the optical disc (not illustrated), passing through the opening 5D provided in the housing body 5H, toward the outside of the housing body 5H. Further, the one bonding protrusion 6 and the other bonding protrusion 7 are extended in parallel with each other.

The pair of the bonding protrusions 6 and 7 are integrally formed using a thermoplastic synthetic resin on the housing body 5H according to the injection molding method. The pair of the bonding protrusions 6, 7 and the housing body 5H are formed using the same material and in one piece. As the thermoplastic synthetic resin, a polyarylene sulfide resin, such as polyphenylene sulfide having preferable electric characteristics, such as thermal stability, insulating property, or the like; preferable mechanical characteristics; and preferable dimensional stability may be employed. A material including the polyphenylene sulfide (PPS) resin as a base may be, for example, DIC-PPS glass fiber reinforced heat resistant series (cross linked type) FZ-1130 D5 manufactured by DAINIPPON INK AND CHEMICALS, INC. By mixing glass fiber into the base, mechanical or other characteristics of the housing 5 can be reinforced. The housing 5 may be formed using the PPS.

The adhesives 206 and 207 (shown in FIGS. 3 and 4) are applied to the side surfaces 16 and 17 of the protective member 15 constituting the PDIC 10 (shown in FIGS. 1 to 4). Correspondingly, the adhesives 206 and 207 (shown in FIGS. 3 and 4) are also applied to the tip faces 6a and 7a (shown in FIG. 1) of the protrusions 6 and 7 in the housing 5.

In this manner, the PDIC 10 can be bonded to the housing 5 with a high degree of precision. Because the adhesives 206 and 207 are applied to both the side surfaces 16 and 17 of the protective member 15 constituting the PDIC 10 and the tip faces 6a and 7a of the protrusions 6 and 7 in the housing 5, the operation of bonding the protective member 15 of the PDIC 10 to the protrusions 6 and 7 of the housing 5 can be easily performed, which in turn reduces the occurrence of faulty bonding due to difficulties in bonding operation. Facilitated bonding operation allows accurate bonding of the side surfaces 16 and 17 of the protective member 15 constituting the PDIC 10 and the tip faces 6a and 7a of the protrusions 6 and 7 in the housing 5.

The adhesive 206 (shown in FIGS. 3 to 5) is heavily applied (as shown in FIGS. 3 and 4) between the one side surface 16 (shown in FIG. 5) of the protective member 15 constituting the PDIC 10 and the tip face 6a (shown in FIGS. 1, 2, and 5) of the one protrusion 6 provided to the housing body 5H. On the other hand, the adhesive 207 is heavily applied (as shown in FIGS. 3 and 4) between the other side surface 17 of the protective member 15 constituting the PDIC 10 and the tip face 7a (shown in FIG. 1) of the other protrusion 7 provided to the housing body 5H.

After curing, the adhesive 206 (shown in FIGS. 3 to 5) is configured to be a joint 206 connecting one side (a first side) 16 of the protective member 15 constituting the PDIC 10 and one protrusion (a first protrusion) 6 of the housing 5, while the adhesive 207 (shown in FIGS. 3 and 4) is configured, after curing, to be a joint 207 connecting the other side (a second side) 17 of the protective member 15 constituting the PDIC 10 and the other protrusion (a second protrusion) 7 of the housing 5. Both of the joints 206 and 207 reliably fix the PDIC 10 to the housing 5. Each of the joints 206 and 207 is formed to be about half the size of a grain of rice.

Through this formation of the joints 206 and 207 obtained by curing the adhesives 206 and 207, the PDIC 10 is securely fixed to the housing 5.

Because the adhesive 206 is heavily applied on an area between the one side surface 16 of the protective member 15 constituting the PDIC 10 and the tip face 6a of the one protrusion 6 provided to the housing 5, the one side surface 16 and the tip face 6a are bridged by the adhesive 206.

On the other hand, the adhesive 207 is heavily applied on an area between the other side surface 17 of the protective member 15 constituting the PDIC 10 and the tip face 7a of the other protrusion 7 provided to the housing 5, the other side surface 17 and the tip face 7a are bridged by the adhesive 207.

The adhesives 206 and 207 applied between the side surfaces 16, 17 of the protective member of the PDIC 10 and the tip faces 6a, 7a of the protrusions 6, 7 in the housing 5 are cured and then configured to form a pair of the joints 206 and 207 which securely connect the protective member 15 of the PDIC 10 to both of the protrusions 6, 7 of the housing 5. Through the joints 206 207 formed by curing the adhesives 206 and 207, the PDIC 10 is securely fixed to the housing 5.

The tip face 6a of the one protrusion 6 provided to the housing 5 and the tip face 7a of the other protrusion 7 provided to the housing 5 are formed to be almost parallel planes. In other words, the tip face 6a of the one protrusion 6 provided to the housing 5 and the tip face 7a of the other protrusion 7 provided to the housing 5 are formed so as to be aligned with (to be flush with) a virtual plane.

The protective member 15 constituting the PDIC 10 (shown in FIGS. 1 to 4) in the shape of a roughly rectangular box comprises one side surface 16 and the other side surface 17 opposing to the one side surface 16. The fixing members 6 and 7 of the housing 5 are formed as a pair of almost flat plates and configured to include one protrusion 6 and the other protrusion 7 which is disposed in parallel with the one protrusion 6.

A mounting position of the one side surface (the first side surface) 16 of the protective member 15 is determined in accordance with the tip face 6a (shown in FIGS. 1 and 2) of the one protrusion (the first protrusion) 6 (as shown in FIGS. 3 to 5). The adhesive 206 (shown in FIGS. 3 to 5) is applied to both the one side surface 16 of the protective member 15 and the tip face 6a of the one protrusion 6 (shown in FIGS. 1 and 2). The adhesive 206 is cured and then configured to form one joint (a first joint) 206 (shown in FIGS. 3 to 5) connecting the one side surface 16 of the protective member 15 (shown in FIGS. 1 and 2) and the tip face 6a of the one protrusion 6.

On the other hand, a mounting position of the other side surface (the second side surface) 17 is determined in accordance with the tip face 7a of the other protrusion (the second protrusion) 7 (as shown in FIGS. 3 and 4). The adhesive 207 is applied to both the other side surface 17 of the protective member 15 and the tip face 7a (shown in FIG. 1) of the other protrusion 7 (as shown in FIGS. 3 and 4). By curing, the adhesive 7 is configured as the other joint (the second joint) 207 (shown in FIGS. 3 and 4) connecting the other side surface 17 of the protective member 15 and the tip face 7a (shown in FIG. 1) of the other protrusion 7.

By such a bonding manner, the PDIC 10 having the protective member 15 in the shape of a roughly rectangular box is fixed to the housing 5 having a pair of the protrusions 6 and 7 in a accurately positioned state. The mounting position of the side surfaces 16 and 17 of the protective member 15 formed in the shape of a roughly rectangular box is accurately determined relative to the pair of the protrusions 6 and 7 formed in an almost flat shape and, in that state, the side surfaces 16 and 17 are fixed by the adhesives 206 and 207.

Therefore, the optical pickup device 1 configured in such a manner that the PDIC 10 is fixed to the housing 5 by bonding with a high degree of precision can be supplied to an optical disc apparatus fabricator or the like. Further, it is possible for a manufacturer, such as a fabricator of the optical pickup device 1 to accurately fix the PDIC 10 to the housing 5 by bonding in an assembling process of the optical pickup device 1.

To determine the mounting position of the one side surface 16 of the protective member 15 relative to the tip face 6a of one protrusion 6 and the mounting position of the other side surface of the protective member 15 relative to the tip face 7a of the other protrusion 7, a removable tacking tape (not illustrated) is temporarily used. Self-adhesive tape, such as, for example, polyimide adhesive tape, may be employed as the tacking tape. The polyimide adhesive tape may be, for example, Polyimide Adhesive Tape No. 360 Series manufactured by Nitto Denko Corporation, KAPTON® H type manufactured by DuPont-Toray Co., Ltd, or the like.

Next, a process of mounting the PDIC 10 on the housing 5 will be described, the process in which the PDIC 10 is positioned relative to optical-system components installed in the housing 5. The coupling portion 111 joining the main circuit portion 101 to the first sub-circuit portion 110 is bent into an almost right angle with respect to the main circuit portion 101 constituting the FPC 100 (as shown in FIGS. 2 and 3). In this bent state, the polyimide adhesive tape (not illustrated) is stuck on the housing 5 and the PDIC 10. In this manner, the coupling portion 111 of the FPC 100 is maintained in the position bent into the almost right angle.

Next, to form the FPC 100 in the above-described bent shape, the optical pickup device 1 having various components including the FPC 100 is placed in a heating oven, such as an electric furnace (not illustrated). The optical pickup device 1 having various components including the FPC 100 is then subjected to heat treatment, such as annealing, here referring to a treatment by heat to eliminate distortion remaining in the material. To avoid exerting an adverse effect due to heat on the various components constituting the optical pickup device 1, the heat treatment is performed at temperatures of, for example, approximately 80° C. or lower.

In the state in which the coupling portion 111 of the FPC 100 is bent, a reform process is performed such that the coupling portion 111 of the FPC 100 is heated at a temperature of, for example, approximately 80° C. for twelve hours. By the reform process, the coupling portion 111 of the FPC 100 is prevented from returning to its previous roughly flat shape, thereby securing the formation of a bent section 113 gradually curved to an almost right angle in the FPC 100.

After the coupling portion 111 of the FPC 100 is heated in a curved state at a temperature of approximately 80° C. for about 12 hours, the FPC 100 is prevented from returning to the previous roughly flat shape by the bent section 113 curved at the almost right angle and formed at the coupling portion 111 of the FPC 100. The coupling portion 111 of the FPC 100 is heated in the curved state to form the bent section 113 at the coupling portion 111 of the FPC 100. Through such a heat treatment, the bent section 113 gradually curved to an almost right angle is formed to the coupling portion 111 of the FPC 100. The FPC 100 is installed in the housing 5 in a state gradually curved in accordance with the housing.

As shown in FIG. 1, the PDIC 10 is attached to the first sub-circuit portion 110 of the FPC 100 which transmits an electrical signal sent from and sent to the PDIC 10. By means of soldering, the PDIC 10 is connected in an electrically communicable manner to the first sub-circuit portion 110 of the FPC 100. A pair of clearance portions 116 and 117 are provided to the FPC 100 to accommodate to a pair of bonding protrusions 6 and 7 formed to the housing 5. One of the clearance portions (a first clearance portion) 116 is provided to the FPC 100 corresponding to the one bonding protrusion (the first bonding protrusion) 6 formed to the housing 5. The clearance portion 116 provided to the flexible substrate 100 is configured to be a recess 116 formed in a roughly concave shape. On the other hand, the other (second) clearance portion, the clearance portion 117, is provided to the FPC 100 corresponding to the other bonding protrusion (the second bonding protrusion) 7 formed to the housing 5. The clearance portion 117 provided to the flexible substrate 100 is configured to be a cut-through portion 117 formed in a roughly rectangular shape.

The adhesive 206 (shown in FIGS. 3 to 5) is applied from the tip face 6a (shown in FIG. 1) of the one bonding protrusion 6 provided to the housing body 5H, passing through the concave clearance portion 116 of the FPC 100 (shown in FIGS. 3 to 5), to the one side surface 16 (shown in FIG. 5) of the protective member 15 of the PDIC 10. On the other hand, the adhesive 207 (shown in FIGS. 3 and 4) is applied from the tip face 7a (shown in FIG. 1) of the other bonding protrusion 7 provided to the housing body 5H, passing through the through-hole clearance portion 117 of the FPC 100 (shown in FIGS. 3 and 4), to the other side surface 17 of the protective member 15 in the PDIC 10.

By this configuration, the PDIC 10 attached to the FPC 100 can be secured to the housing 5 through the adhesives 206 and 207 without interference with the FPC 100 during fixing operation.

For example, if the recessed clearance portion 116 corresponding to the one bonding protrusion (6) in the housing 5 (shown in FIG. 1) is not provided to the FPC 100, it is possible that the FPC 100 will interfere with application of the adhesive 206 to the area between the one bonding protrusion 6 in the housing 5 (shown in FIGS. 3 to 5) and the one side surface 16 of the protective member 15 constituting the PDIC 10, such that the adhesive 206 on an area between the tip face 6a (shown in FIG. 1) of the one bonding protrusion 6 formed to the housing body 5H will not readily bond with the one side surface 16 of the protective member 15 constituting the PDIC 10 (shown in FIGS. 3 to 5)

On the other hand, if the cut-through clearance portion 117 corresponding to the other bonding protrusion 7 in the housing 5 (shown in FIG. 1) is not provided to the FPC 100, for example, it is possible that the FPC 100 will interfere application of the adhesive 207, thereby hampering application of the adhesive 207 on an area between the other bonding protrusion 7 of the housing 5 (shown in FIGS. 3 and 4) and the other side surface 17 of the protective member 15 constituting the PDIC 10, rendering application of the adhesive 207 to an area between the tip face 7a (shown in FIG. 1) of the other bonding protrusion 7 provided to the housing body 5H and the other side surface 17 of the protective member 15 constituting the PDIC 10 (shown in FIGS. 3 and 4) impossible.

However, provision of the recessed clearance portion 116 corresponding to the one bonding protrusion 6 of the housing 5 (shown in FIG. 1) can facilitate quick and easy application of the adhesive 206 (shown in FIGS. 3 to 5), such that the adhesive 206 is deposited on an area from the tip face 6a (shown in FIG. 1) of the one bonding protrusion 6 provided to the housing body 5H, passing through one of the clearance portions 116 in the FPC 100 (shown in FIGS. 3 to 5), to the one side surface 16 of the protective member 15 constituting the PDIC 10 without interference with the FPC 100.

On the other hand, provision of the cut-through clearance portion 117 corresponding to the other bonding protrusion 7 of the housing 5 (shown in FIG. 1) can facilitate quick and easy application of the adhesive 207 (shown in FIGS. 3 and 4) such that the adhesive 207 is deposited on an area from the tip face 7a (shown in FIG. 1) of the other bonding protrusion 7 provided to the housing body 5H, passing through the other one of the clearance portions 117 of the FPC 100 (FIGS. 3 and 4), to the other side surface 17 of the protective member 15 constituting the PDIC 10 without interference with the FPC 100.

As a result, the process of applying the adhesives 206 and 207 to fix the PDIC 10 on the housing 5 can be completed quickly and efficiently.

It is preferred that the PDIC 10 be bonded to the housing 5 using the adhesives 206 and 207 of a photocurable type which is cured by irradiation with light. More specifically, ultraviolet curable adhesives 206 and 207 which are cured by ultraviolet irradiation are used to bond the PDIC 10 to the housing 5 for fixation of the PDIC 10 on the housing 5.

When the bonding process is executed using a photocurable adhesive, such as the ultraviolet curable adhesives 206, 207 or the like, the PDIC 10 can be fixed on the housing 5 quickly and easily. By irradiating light onto the photocurable adhesives 206 and 207, curing reaction of the photocurable adhesives 206 and 207 is promoted to bond the PDIC 10 to the housing 5. More specifically, when ultraviolet light is irradiated onto the ultraviolet curable adhesives 206 and 207, curing of the ultraviolet curable adhesives 206 and 207 is promoted, which helps quick bonding of the PDIC 10 and the housing 5. Further, the use of adhesives 206 and 207 of a photocurable type, such as the ultraviolet curable adhesives 206 and 207 or the like, enables the fixing the PDIC 10 to the housing 5 with a high degree of precision.

Accordingly, the optical pickup device 1 in which the PDIC 10 is precisely fixed to the housing 5 can be provided to a manufacturer, such as a factory for assembling optical discs or the like. Further, it is possible for the manufacturer, such as a factory for assembling optical discs to fix the PDIC 10 to the housing 5 with a high degree of precision.

As examples of the photocurable adhesives, UV adhesives of Norland Optical Adhesives NOA 60, NOA 77, and others distributed by Norland Product Inc. in the U.S.A. may be employed. Because the ultraviolet curable adhesives of Norland Optical Adhesives NOA 60, NOA 77, etc. are acrylic and of one component type, it is not necessary to perform a mixing operation as is required when a two component adhesive is used. Accordingly, the process of applying the adhesives can quickly be completed with efficiency. Here, it should be noted that an ultraviolet curable adhesive is also referred to as a UV curable adhesive. The optical pickup device 1 obtained by using, for example, a two component ultraviolet curable adhesive to perform the bonding process may be employed in consideration of design specifications for the optical pickup device and the flexible substrate. The two component ultraviolet curable adhesive may be, for example, a two component epoxy ultraviolet curable adhesive.

Next, a process for assembling the optical pickup device 1, in which the flexible substrate 100 having the PDIC 10 is attached to the housing 5 made of a synthesis resin, will be described with reference to FIGS. 1 to 5.

As shown in FIGS. 1 and 2, an attachment 108 of the flexible substrate 100 is aligned above the housing 5, and then the coupling portion 111 joining the main circuit portion 101 of the flexible substrate 100 to the first sub circuit portion 110 is bent (as shown in FIG. 3). In this state, in which the coupling portion 111 of the flexible substrate 100 has been bent, the ultraviolet curable adhesives 206 and 207 are applied to both the tip faces 6a, 7a (shown in FIG. 1) of the bonding protrusions 6, 7 provided to the housing 5 and the side surfaces 16, 17 of the protective member 115 of the PDIC 10 (shown in FIG. 3). Subsequently, by irradiating the above-described adhesives 206 and 207 with ultraviolet light, the adhesives 206 and 207 are cured, thereby fixing the PDIC 10 on the housing 5.

Further, as shown in FIG. 4, a cover plate 150 for protecting various components in the housing 5 is put on the upper surface of the housing 5. The cover plate 150 made of a metal and having preferable heat dispersion characteristics is equipped with a black enclosure member 160 made of a synthetic polymer surrounding the lens holder 65. The first guide axis (not illustrated) is aligned with the first guide 5I of the housing 5, and the second guide axis (not illustrated) is aligned with the second guides 5II of the housing 5. The housing 5 of optical pickup device 1 is supported by the first and second guide axes while moving. The guides 5I and 5II installed in the housing 5 are made of a material in which the base material is composed of the same heat-resistant synthetic polymer as that used for the housing body 5H, thereby achieving preferable slidability. The housing 5 of the optical pickup device 1 moves substantially along the longitudinal direction of the main circuit 101 of the flexible substrate 100.

The optical pickup device 1 described above may be mounted on an optical disc apparatus only for reading data compatible with, CD-ROM, DVD-ROM, for example. The above-described optical pickup device 1 may also be mounted on an optical disc apparatus supporting read-only optical discs, such as CD-ROM, DVD-ROM, or the like, write-once optical discs, such as CD-R, DVD-R, DVD+R, or the like, recordable/erasable or rewritable optical discs, such as CD-RW, DVD-RW, DVD+RW, DVD-RAM, HD-DVD, Blue-ray disc, or the like.

An optical disc apparatus comprising the above-described optical pickup device 1 may be equipped, for example, in a personal computer (PC), such as a notebook PC (not illustrated), a desktop PC (not illustrated), in an acoustic device, such as a CD player, and in an audio/visual device (not illustrated), such as a DVD player. Further, the optical disc apparatus is capable of supporting a plurality of media including CD series optical discs, and DVD series optical discs, or the like.

The optical disc apparatus may be applied to an optical disc player (not illustrated) compatible with either or both of a CD and a DVD. Such a CD or DVD player and a player compatible with both CD and DVD are embedded and used, for example, in a notebook PC, a desktop PC, or the like. A desktop PC is a unit designed for use at a desk, and is therefore not usually portable.

As opposed to as desktop PC, in which performance and cost are generally the most important design considerations, reduction in weight and thickness is most desired for a notebook PC, and a typical notebook PC comprises an optical disc apparatus with a slim type drive. The notebook PC has, as distinct from the desktop PC, a display which is integral with the system unit of the PC. By folding the display toward the system unit, the notebook PC is configured to have a low-profile size. When folded, the notebook PC can be a general purpose computer of a size substantially equal to or smaller than metric paper size A4. A notebook PC is also referred to as a book type PC. Such a compact notebook PC is easy to carry.

The housing 5 constituting the optical pickup device 1 (shown in FIGS. 1 to 4) may be equipped in the disc apparatus for a notebook PC required to be slim. In consideration of this possibility, the housing 5 is formed in a roughly flat shape with a low profile.

By installing, in the disc apparatus for a notebook PC, an optical pickup device 1 (shown in FIG. 4) having a structure that the PDIC 10 is directly attached to the housing 5 (shown in FIGS. 3 and 4) through bonding, improper functioning of the optical pickup device 1 due to unstable servo action of the optical pickup device 1 installed in the disc apparatus can be prevented.

The size, weight, and thickness of common notebook PCs is further reduced while achieving ever higher performance. The optical pickup device 1 is also downsized, reduced in weight, and slimmed down in keeping with this trend towards downsizing, weight reduction, and slimming of notebook PCs. The notebook PCs are usually smaller than desktop PCs and, in an attempt to achieve ever higher performance, more easily heated to high temperatures than desktop PCs. Accordingly, the optical pickup device 1 installed in a disc apparatus for a notebook PC is more likely to be exposed to high temperatures, thereby being more vulnerable to heat. The optical pickup device 1 equipped in the notebook PC is used at temperatures between approximately 0° C. and approximately 70° C.

However, as long as the PDIC 10 is directly attached to the housing 5 constituting the optical pickup device 1 equipped in the disc apparatus for a notebook PC, an error of mounting dimension of the PDIC 10 relative to the housing 5 is suppressed, even when the optical pickup device 1 is used under conditions of greatly changing temperatures. Therefore, positional deviation of the PDIC 10 relative to the housing 5 is prevented. As a result, changes in the focus of light incident to the PDIC 10 is also avoided, thereby assuring stable operation of the servo mechanism in the optical pickup device 1 equipped in the disc apparatus of the notebook PC.

The optical pickup device according to the present invention is not limited to the examples shown in the figures. For example, the optical pickup device of the present invention may be equipped in audio/visual equipment, a PC, or other device having no cooling device, such as a cooling fan, provided thereto.

Further, the present invention may be applied regardless of whether or not a support plate made of aluminum or a heat-resistant synthetic resin is provided to the first sub circuit portion 110 constituting the flexible substrate 100. It will also be understood by those skilled in the art that various other changes and modifications may be made in the invention without departing from the spirit and scope thereof.

What is claimed is:

1. An optical pickup device comprising:
    a photodetector which receives laser light reflected from a disc,
    a housing in which the photodetector is housed, and
    a flexible substrate through which a signal of the photodetector is transmitted,
    wherein the photodetector comprises a photo receiver on which the laser light is irradiated and a protective member which protects the photo receiver and to which an adhesive is applied,
    the housing comprises a fixing member which is provided corresponding to the protective member and to which an adhesive is applied;
    the flexible substrate includes a clearance portion that serves to keep away from the fixing member of the housing when the flexible substrate is mounted on the housing,
    the flexible substrate is mounted onto the housing while keeping away from the fixing member by the clearance portion,
    the photodetector is attached to the flexible substrate, and is directly attached to the housing by an adhesive applied to the protective member and the fixing member.

2. An optical pickup device according to claim 1, wherein the photodetector is directly bonded to the housing.

3. An optical pickup device according to claim 1, wherein the fixing member is formed as a protrusion extending from a peripheral wall of the housing toward the outside of the housing.

4. An optical pickup device according to claim 1, wherein the adhesive is applied to a side of the protective member, and the adhesive is applied to a tip of the fixing member.

5. An optical pickup device according to claim 1, wherein the adhesive is applied in such a manner that it is heavily deposited between a side of the protective member and a tip of the fixing member, and
    there is formed a joint connecting the protective member and the fixing member, through which the photodetector is fixed to the housing.

6. An optical pickup device according to claim 1, wherein the protective member is formed in a shape of a roughly rectangular box and has a first side and second side opposing to the first side,
    the fixing member is configured as a pair of roughly flat plates consisting of a first fixing member and a second fixing member aligned with the first fixing member,
    a mounting position of the first side of the protective member is determined in accordance with a tip of the first fixing member,
    the adhesive is applied to the first side of the protective member and the tip of the first fixing member and configured to constitute a first joint connecting the first side of the protective member and the tip of the first fixing member,
    a mounting position of the second side of the protective member is determined in accordance with a tip of the second fixing member,
    the adhesive is applied to the second side of the protective member and the tip of the second fixing member and configured to constitute a second joint connecting the second side of the protective member and the tip of the second fixing member.

7. An optical pickup device according to claim 2, wherein the photodetector is bonded to the housing using an ultraviolet curable adhesive which is cured by irradiation of ultraviolet light.

8. An optical pickup device according to claim 1, wherein the housing is adapted to be equipped in a disc apparatus for a notebook computer.

* * * * *